United States Patent
Sui et al.

(10) Patent No.: US 11,434,412 B2
(45) Date of Patent: Sep. 6, 2022

(54) SULFATE SCALE INHIBITION IN HIGH PRESSURE AND HIGH TEMPERATURE APPLICATIONS

(71) Applicant: BL Technologies, Inc., Minnetonka, MN (US)

(72) Inventors: Caroline Chihyu Sui, Trevose, PA (US); Claudia C. Pierce, Trevose, PA (US)

(73) Assignee: BL Technologies, Inc., Minnetonka, MN (US)

( * ) Notice: Subject to any disclaimer, the term of this patent is extended or adjusted under 35 U.S.C. 154(b) by 276 days.

(21) Appl. No.: 16/483,089

(22) PCT Filed: Feb. 27, 2017

(86) PCT No.: PCT/US2017/019567
§ 371 (c)(1),
(2) Date: Aug. 2, 2019

(87) PCT Pub. No.: WO2018/156154
PCT Pub. Date: Aug. 30, 2018

(65) Prior Publication Data
US 2019/0375981 A1    Dec. 12, 2019

(51) Int. Cl.
| | | |
|---|---|---|
| C09K 8/528 | (2006.01) | |
| C09K 8/592 | (2006.01) | |
| C09K 8/62 | (2006.01) | |
| E21B 37/06 | (2006.01) | |
| E21B 43/26 | (2006.01) | |
| C09K 8/035 | (2006.01) | |

(52) U.S. Cl.
CPC .............. *C09K 8/528* (2013.01); *C09K 8/035* (2013.01); *C09K 8/592* (2013.01); *C09K 8/62* (2013.01); *E21B 37/06* (2013.01); *E21B 43/26* (2013.01)

(58) Field of Classification Search
None
See application file for complete search history.

(56) References Cited

U.S. PATENT DOCUMENTS

| | | |
|---|---|---|
| 3,483,925 A | 12/1969 | Slyker |
| 5,062,962 A | 11/1991 | Brown et al. |

(Continued)

FOREIGN PATENT DOCUMENTS

| | | |
|---|---|---|
| CA | 2758686 A1 | 5/2013 |
| CN | 101913712 A | 12/2010 |

(Continued)

OTHER PUBLICATIONS

International Search Report and Written Opinion dated Jul. 28, 2017 in International Appl. No. PCT/US2017/019567; 11 pages.

*Primary Examiner* — John J Figueroa
(74) *Attorney, Agent, or Firm* — Armstrong Teasdale LLP

(57) ABSTRACT

Methods are provided to inhibit scale formation in oil or gas production systems. In one embodiment, the scale inhibiting treatment comprises: A) an AAA terpolymer and B) a phosphonate. The treatment can be added to these systems in the well area itself, to the well annulus and its associated tubes, casings, etc., to the oil or gas bearing subterranean formation, to injection conduits for injecting steam or fracking fluid to the subterranean formation, to the produced water or to equipment in fluid flow contact with the produced water.

20 Claims, 1 Drawing Sheet

(56) References Cited

U.S. PATENT DOCUMENTS

| | | | |
|---|---|---|---|
| 5,068,042 A * | 11/1991 | Hen | C09K 8/528 |
| | | | 507/236 |
| 5,147,555 A | 9/1992 | Brown et al. | |
| 5,409,062 A | 4/1995 | Brown et al. | |
| 6,613,899 B1 * | 9/2003 | Kuzee | C09K 8/528 |
| | | | 536/124 |
| 6,641,754 B2 | 11/2003 | Buentello et al. | |
| 7,094,852 B2 | 8/2006 | Solov et al. | |
| 8,236,734 B1 | 8/2012 | Shen et al. | |
| 8,366,915 B2 | 2/2013 | Goliaszewski et al. | |
| 8,728,324 B2 | 5/2014 | Meskers, Jr. et al. | |
| 2004/0087448 A1 * | 5/2004 | Smith | E21B 36/003 |
| | | | 507/100 |
| 2010/0292106 A1 | 11/2010 | Sanders et al. | |
| 2011/0124533 A1 * | 5/2011 | Notte | C02F 5/14 |
| | | | 507/235 |
| 2012/0028856 A1 | 2/2012 | Herve et al. | |
| 2013/0341282 A1 * | 12/2013 | Meskers, Jr. | F22B 37/486 |
| | | | 210/700 |
| 2014/0190692 A1 | 7/2014 | Hibbeler et al. | |
| 2014/0216748 A1 * | 8/2014 | Pou | C09K 8/54 |
| | | | 166/305.1 |
| 2014/0262247 A1 * | 9/2014 | Duenckel | E21B 47/11 |
| | | | 166/250.12 |
| 2014/0338915 A1 * | 11/2014 | Ferm | C02F 5/10 |
| | | | 166/307 |
| 2014/0367101 A1 * | 12/2014 | Welton | C09K 8/80 |
| | | | 166/280.2 |
| 2015/0129225 A1 * | 5/2015 | Ghorbani | E21B 43/16 |
| | | | 166/304 |
| 2016/0075941 A1 * | 3/2016 | Duenckel | C09K 8/524 |
| | | | 166/280.2 |
| 2016/0222279 A1 * | 8/2016 | Cassidy | E21B 41/02 |
| 2017/0114272 A1 * | 4/2017 | Vo | C09K 8/706 |

FOREIGN PATENT DOCUMENTS

| | | |
|---|---|---|
| CN | 104528967 B | 4/2015 |
| EP | 0564248 A1 | 10/1993 |
| EP | 0599832 B1 | 7/1996 |
| EP | 2082991 A1 | 7/2009 |
| EP | 2303983 B1 | 9/2012 |
| GB | 2448442 B | 10/2008 |
| WO | 2009080498 A1 | 7/2009 |
| WO | 2014003942 A1 | 1/2014 |

\* cited by examiner

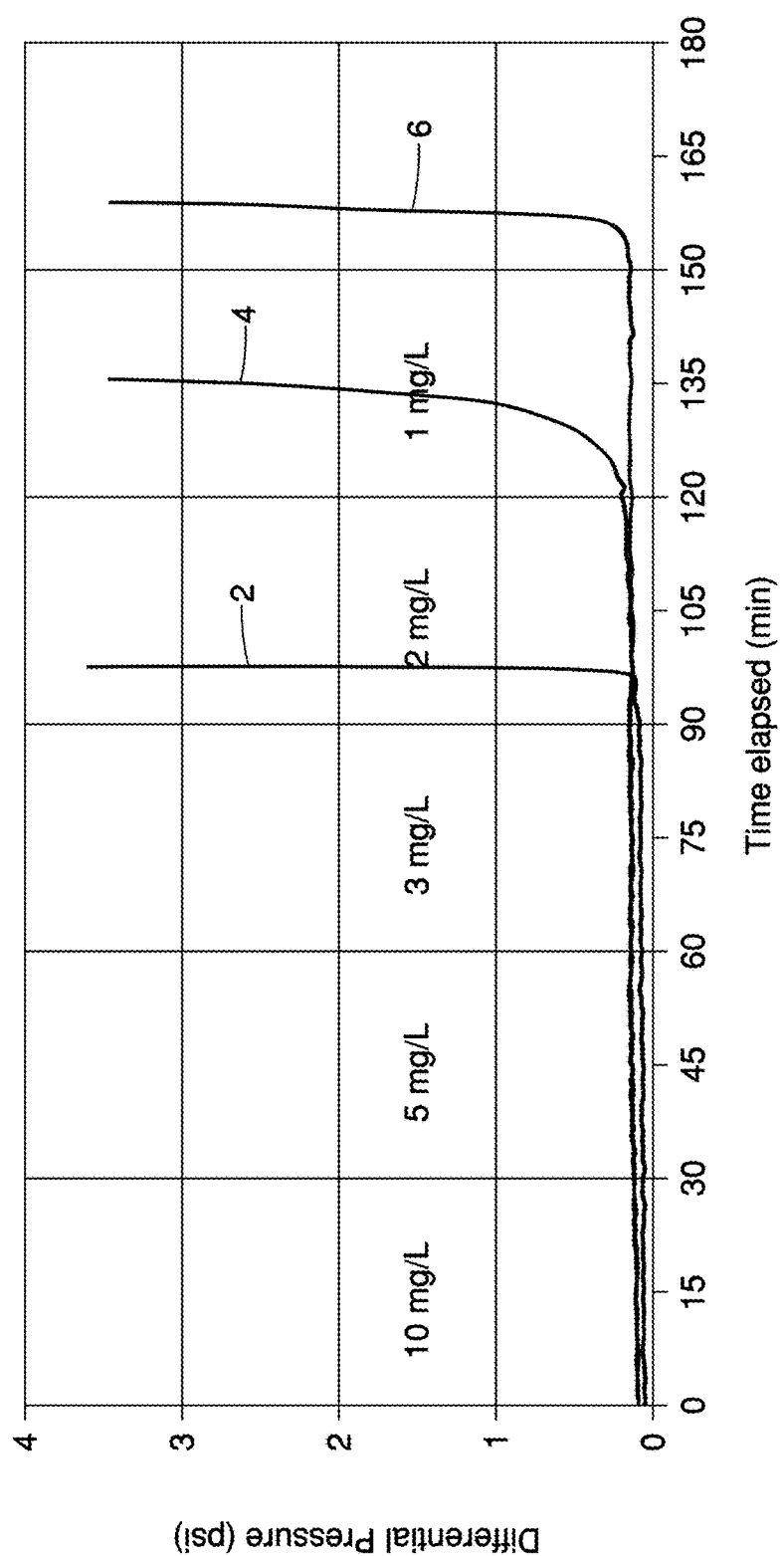

SULFATE SCALE INHIBITION IN HIGH PRESSURE AND HIGH TEMPERATURE APPLICATIONS

CROSS-REFERENCE TO RELATED APPLICATION

This application is a national phase of International Patent Application No. PCT/US2017/019567 filed Feb. 27, 2017, which is incorporated herein by reference in its entirety.

FIELD OF INVENTION

The invention pertains to methods for inhibiting scale formation in oil and gas well brines. In some aspects, the methods are useful in inhibiting calcium sulfate based scale formation in oilwell brines.

BACKGROUND OF THE INVENTION

Steam is used to recover heavy oil in many geologic formations. In these formations, steam is required to increase the mobility of oil within the formation. Steam is injected into the subterranean formation that contains the oil. The steam condenses resulting in an oil/water mixture that is gathered by an oil/water gathering well, through which the oil/water mixture is pumped to the surface. Typically, the oil/water mixture is sent to an oil/water separator in which the desired oil is separated from the water and recovered for sale. The produced water stream, after separation of the oil, is further de-oiled in a de-oiling process step. In many operations, the produced water is subjected to further downstream treatments including softeners, filters, ion-exchange systems, evaporators, and the like until it is ready for discharge or recycle to report to a steam generator that produces steam for injection into the oil bearing subterranean formation.

In natural gas production, pressurized liquid fracking solutions are injected into the subterranean formation. These solutions contain primarily water and proppants that are suspended in the water via thickening agents and the like. This solution breaks up rocky deposits in the formation. Since the gas is lighter than the fracking solution, it rises to the top of the well for recovery. Again, brine containing water suspensions or solutions is produced and needs to be treated for water discharge or further use of the recovered water in the process such as in feedwater to the fracking pumps.

Scale formation in oil or gas wells and associated equipment is a serious problem. Brine laden water produced during oil or gas production is referred to as "produced water" and is the source of scale formation in the well itself and in associated casing, tubing, pipes, and valves. This scale formation is also of concern in equipment used to process or transport the produced water.

The produced water contains high concentrations of alkaline earth metal cations such as calcium, strontium, and barium, and anions including carbonate, bicarbonate, and sulfate.

Over time, and if left untreated, scale deposit formation can reduce fluid flow and heat transfer functions and promote corrosion and bacterial growth. As the deposits grow, production rates decrease, and the entire operation may need to be shut down for cleaning and scale removal operations.

SUMMARY OF THE INVENTION

In accordance with one exemplary embodiment of the invention, a method is provided to inhibit scale formation in an oil or gas production system. In one aspect of the invention, a water soluble or dispersible polymer having the formula I

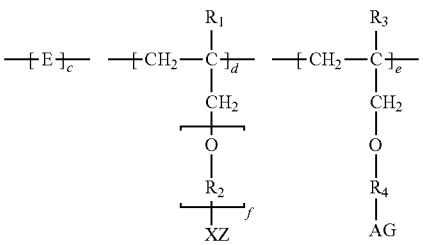

is conjointly used with a phosphonate. In formula I, E is a repeat unit wherein E is the repeat unit remaining after polymerization of an ethylenically unsaturated compound, preferably a carboxylic acid, sulfonic acid, phosphonic acid, or amide form thereof or mixtures thereof; $R_1$ is H or lower alkyl ($C_1$-$C_4$);

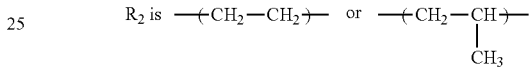

or $-(CH_2-CH_2-CH_2-)$; f is an integer of about 1-100, preferably from about 1-20, X and A are independently selected and are an anionic group selected from $OSO_3$, $SO_3$, $PO_3$, $OPO_3$, or $COO$; G and Z are independently selected and are chosen from H or a cationic group such as Na, K, or $NH_4$; $R_3$ is H or lower alkyl ($C_1$-$C_4$), and $R_4$ is a hydroxyl substituted alkylene radical having from 1 to about 6 carbon atoms.

Subscripts c, d, and e represent the molar amounts of the monomer repeat units in the polymer. In one exemplary embodiment, c is from about 1-80; d is about 0-30; and e is about 0-30 with the proviso that at least one of d and e must be present, and that c+d+e=100. In other embodiments, c is from about 1-80, d is about 1-30, and e is about 1-30, wherein c+d+e=100.

In other aspects of the invention, a brine laden aqueous product is produced in the oil or gas production system and is thereby defined as "produced water". In some embodiments, the invention comprises adding the scale inhibiting treatment directly to the produced water. In some cases, the produced water comprises a calcium content of 400 mg/L or greater (as $Ca^{+2}$) and in other instances, the produced water has a temperature of 90° C. and higher and is under a pressure of about 1 Atmosphere (Atm) and greater. In some cases, the pressure may be about 300 psig or greater.

Other embodiments are directed toward inhibition of calcium sulfate, calcium carbonate, or barium sulfate scale in oil and gas production systems.

In some instances, the combined treatment is fed to the produced water in an amount of about 0.1-100 mg/L (combined polymer and phosphonate) of the produced water.

In certain exemplary embodiments, component (A) of the combined scale inhibiting treatment is a terpolymer comprising repeat units of i) acrylic acid or salt, ii) allylalkoxylated ether or water soluble salt, and iii) allylhydroxylated alkyl ether or water soluble salt thereof. This terpolymer is sometimes herein referred to as an AAA terpolymer. In other exemplary embodiments, component A is a terpolymer of i)

acrylic acid or salt, ii) allylpolyethoxy (10) sulfonate, and iii) allylhydroxypropylsulfonate ether.

In certain instances, the scale inhibiting treatment is added to the well bore itself, or in some cases, it is added to a casing or tube in fluid communication with the well.

In other embodiments, the scale inhibiting treatment is added to a subterranean oil or gas bearing formation that is a component of the oil or gas production system. Further, in other exemplary embodiments, the scale inhibiting treatment is added to a steam or fracking fluid that is in fluid communication with the subterranean oil or gas bearing formation.

In some embodiments of the invention, the phosphonate component of the combined scale inhibiting treatment is an aminophosphonate. In some embodiments, the aminophosphonate is a member selected from the group consisting of HDTMP=hexamethylenediaminetetra (methylene phosphonic acid)
DTPMP=diethylenetriaminepenta (methylene phosphonic acid)
ATMP=aminotris (methylene phosphonic acid)
EDTMP=ethylenediaminetetra (methylene phosphonate acid)
TMTMP=tetramethylenediaminetetra (methylene phosphonic acid)

Further, in some cases, the aminophosphonate may comprise a polyamino polyether methylene phosphonate.

In other embodiments of the invention, the phosphonate may comprise PBTC—phosphonobutane tricarboxylic acid or HEDP—hydroxethylidene diphosphonic acid.

BRIEF DESCRIPTION OF THE DRAWING

FIG. 1 is a graph showing results of dual scale loop test results attendant upon use of an exemplary scale control treatment in accordance with the invention.

DETAILED DESCRIPTION

In accordance with one exemplary embodiment, a chemical scale control treatment is added to an oil or gas production system. The treatment can, for example, be added to the well bore itself, or to casings, tubes, or the like in communication with the well. In one embodiment, the treatment is added to a subterranean oil or gas bearing formation that is in fluid flow contact with the well. In some cases, the treatment may be added to the injection steam or fracking fluid. The wells may be treated with the scale inhibiting treatment chemicals either as a batch job, with continuous treatment down the annulus or through a feed string, or by a squeeze treatment. A squeeze treatment is a common oil field practice for treating subterranean formations to inhibit scale formation. In a squeeze treatment, a scale inhibitor treatment is injected or squeezed into the reservoir formation. The scale inhibitor forced into the formation is either absorbed by the reservoir mineral, becomes phase trapped or precipitates in the formation. When the well is placed back into production, the inhibitor is slowly produced back into the well bore with the produced water to inhibit scale formation.

In other embodiments, the treatment is added to the produced water upstream from or to operations that require flow or treatment of the produced water therein, such as: (1) an oil/water separator; (2) an oil/gas/water separator; (3) a gas/water separator; (4) a de-oiling station; (5) filter and/or membrane separation units; (6) flotation systems; (7) softener units; (8) ion exchange systems; (9) heat exchangers; (10) reverse osmosis systems; and (11) evaporators, etc.

By use of the phrase "oil or gas well systems", we mean to define treatment addition sites such as the aforementioned along with any other locations in which treatment addition will result in contact of the treatment with the scale imparting anions and cations in such systems.

In other embodiments, the treatment is added to produced waters of the type having a Ca content of 300 mg/L or greater, 800 mg/L or greater, or 1000 mg/L or greater. In some embodiments, temperature of the produced water will be 90° C. and higher under pressures of 1 Atmosphere (Atm) and higher. In some embodiments, the pressure is 300 psig and higher. The treatment is especially effective in inhibiting the formation of calcium sulfate, calcium carbonate, strontium sulfate, and barium sulfate scale.

The scale inhibiting treatment compositions of the invention include a water soluble or water dispersible polymer (I). Generally, the polymer treatment (I) to be added to the water of the high pressure and high temperature system is a polymer represented by the structure:

I

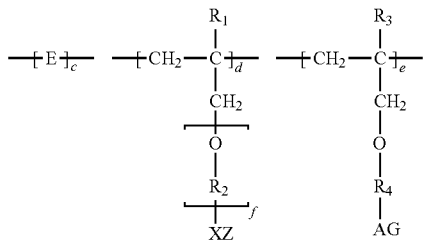

wherein E is the repeat unit remaining after polymerization of an ethylenically unsaturated compound, preferably a carboxylic acid, sulfonic acid, phosphonic acid, or amide form thereof or mixtures thereof; $R_1$ is H or lower alkyl $(C_1\text{-}C_4)$;

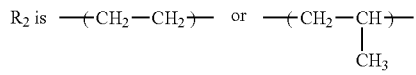

or $-(CH_2-CH_2-CH_2)-$; f is an integer of about 1-100, preferably from about 1-20, X and A are independently selected and are an anionic group selected from $OSO_3$, $SO_3$, $PO_3$, $OPO_3$, or COO; G and Z are independently selected and are chosen from H or a cationic group such as Na, K, or $NH_4$; $R_3$ is H or lower alkyl $(C_1\text{-}C_4)$, and $R_4$ is a hydroxyl substituted alkylene radical having from 1 to about 6 carbon atoms.

Subscripts c, d, and e represent the molar amounts of the monomer repeat units in the polymer. In one exemplary embodiment, c is from about 1-80; d is about 0-30; and e is about 0-30 with the proviso that at least one of d and e must be present, and that c+d+e=100. In other embodiments, c is from about 1-80, d is about 1-30, and e is about 1-30, wherein c+d+e=100.

The molecular weight of the polymer treatments is not critical but, in one embodiment, falls within the range of about Mw 1,000-1,000,000.

In one aspect of the invention, the component (A) comprises an AAA terpolymer of i) acrylic acid or water soluble salt thereof; ii) allylalkoxylated ether or water soluble salt thereof; and iii) allylhydroxylated alkyl ether or water soluble salts thereof. In other embodiments, the terpolymer comprises acrylic acid or salt thereof as repeat unit E; allylethoxy (10) sulfonate as repeat unit d, and allylhydroxypropylsulfonate ether as the repeat unit e. This particular terpolymer may be made in accordance with the method set forth in Example 3 of U.S. Pat. No. 6,641,754. The disclosure of this patent is incorporated by reference herein. In accordance with this example, deionized water, allyloxy-2-hydroxypropane-3-sulfonic acid and ammonium allyl polyethyoxy-(10)-sulfate monomer are charged to a reaction flask. The solution is heated to 85° C. while being sparged with $N_2$. An initiator of 2,2'-azobis (2-amidino propane) hydrochloride is used, and the initiator and acrylic acid are added to the reaction flask over a 3.5 hour period. The solution is then heated to 95° C. and maintained at that temperature for two hours. The reaction medium is then cooled and caustic added.

As a second component, the scale inhibiting treatment comprises a phosphonate. These phosphonates include the phosphonic acids and the salts and esters of the phosphonic acids. Exemplary compounds include, as non-limiting examples, aminophosphonates such as hexamethylenediaminetetra (methylenephosphonic acid) HDTMP; diethylenetriaminepenta(methylenephosphonic acid) DTPMP; aminotris (methylenephosphonic acid) ATMP; ethylenediaminetetra(methylenephosphonic acid) EDTMP; and tetramethylenediaminetetra (methylenephosphonic acid) TMTMP.

Other noteworthy aminophosphonates include polyamino polyether methylene phosphonates of the type set forth in U.S. Pat. No. 8,236,734. The disclosure of this patent is incorporated by reference herein. These phosphonates are represented by the formula

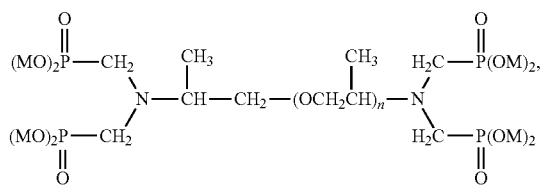

wherein n is 2 or 3 and each M is independently chosen from hydrogen or alkali metal cations. In other embodiments, the phosphonate may comprise PBTC-phosphonobutane tricarboxylic acid or HEDP—hydroxyethylidene diphosphonic acid.

Generally, the combination of AAA and phosphonate may be fed to the oil and gas well system in a weight ratio of 5-20 parts phosphonate per 1 part of AAA. In some embodiments, the weight ratio of phosphonate:AAA is about 8-12 parts phosphonate per I part of AAA. A weight ratio of 10 parts phosphonate:1 parts AAA is particularly noteworthy. In some aspects of the invention, the combined treatment (i.e., phosphonate and AAA) will be added to the oil and gas well system in an amount of about 0.1-100 mg/L of the produced water. In some cases, the phosphonate may be fed at a rate of 1-5 mg/L with the AAA fed at from about 0.1-3.0 mg/L.

EXAMPLES

In order to assess the efficacy of the scale inhibiting composition of the invention, a dynamic scale loop (DSL) apparatus was employed. This device is available from Process Measurement and Control Systems, Aberdeen U.K.

The DSL apparatus is designed to study the precipitation an deposition of scale at reservoir and pipeline conditions of pressure and temperature. It is used to evaluate the efficiency of chemical inhibitors to prevent the formation of mineral scales such as calcium carbonate, calcium sulfate, and barium sulfates. It allows to determine the minimum inhibitor concentration (MIC) required to prevent the deposition of scale and to perform comparative tests with different inhibitors in the same conditions. The system uses the principle of the tube blocking test, which is an industry practice, to determine the minimum inhibitor concentration in dynamic flow conditions at required temperature and pressure. Inhibitor efficiency is measured by the ratio of the time needed to block the tube in the presence of inhibitor divided by the time needed to block the tube without inhibitor.

In accordance with the standard tube blocking tests, anionic and cationic brines are supplied separately through preheated coils to a capillary tube coil that is submerged in a constant temperature liquid bath or oven.

Testing solution is fed into the steam from containers, one containing cationic and the other anionic ions. The treatment product is added to either one or in a separate container containing anionic or cationic solution. The pressure and temperature are set based on testing requirements.

The core component of the system is the capillary test coil installed inside a constant temperature oven. The coil is made of 316 stainless steel (UNS S31600). The diameter of the coil is about 0.88 mm, and the length is about 1 meter.

The anionic and cationic solutions are preheated in the pre-heating coils, then flow through the testing coil. When scale forms inside the coil, the pressure across the capillary coil will increase. A pressure meter records continuously the pressure and map pressure changes over time.

Features of the System:
Pressure: up to 3,000 psi
Fluid Flow Rate: up to 10 ml/min
Temperature Accuracy: 0.1° C.

Testing solutions were synthetically made using deionized water. Separate anionic and cationic solutions were made and the mixture thereof had the following components:

800 mg/L Ca (as $Ca^{+2}$)
2000 mg/L $SO_4$
37,000 mg/L Cl
24,000 mg/L Na
pH 6.65±0.02

The solutions were purged with Ar gas for 15 minutes before the testing began. Tests in the DSL were made under temperature conditions of 200° C. at 300 psig. Flow rate of the solutions was 2+2 mL/min. Test duration was 30 minutes.

In some cases, the candidate treatments were pre-heated under the following conditions:
500 mL of 5000 ppm product, pH adjusted to 8—heated in autoclave at 200° C. for 15 hours.

1. Summary of DSL test results

| | MIC (ppm active) | |
| --- | --- | --- |
| Product Name | Non-Heated | Pre-Heated |
| P & CA | >1 | 3 |
| PECSC | >5 | not tested |

-continued

| Product Name | MIC (ppm active) | |
| --- | --- | --- |
| | Non-Heated | Pre-Heated |
| DTPMP | 2 | 5 |
| HDTMP | 2 | 3 |
| HDTMP/STP terpolymer 10:1 ratio (weight) | <1 | 1 |
| Polyacrylate | >5 | not tested |
| PIPPA | >3 | not tested |

P & CA=phosphonate and carboxylic acid
DTPMP=diethylenetriaminepenta (methylene phosphonic acid)
HDTMP=hexamethylenediaminetetra (methylene phosphonic acid)
STP=acrylic acid AA/ammonium allylethoxy (10) sulfonate AAES/allylhydroxypropyl sulfonate ether AHPSE terpolymer. (See Example 3, U.S. Pat. No. 6,641,754). Molar ratio AA=76.3%; AAES 11%; AHPSE 15.4%. The molecular weight is 12,400.
PIPPA=phosphonic acid (1-methylethenyl)-homopolymer
PECSC=phosphonate end capped sulfonated copolymer
2. The effect of heating the product was studied using the DSL test. Results are shown in FIG. 1 wherein:
a) Line 2 indicates the control test.
b) Line 4 indicates HDTMP.
c) Line 6 indicates HDTMP/STP 10:1 weight ratio, heated at pH 8.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

The invention claimed is:

1. A method of inhibiting scale formation in an oil or gas production system comprising adding to said system a scale inhibiting treatment comprising:
(A) a water soluble or dispersible polymer having the formula
I

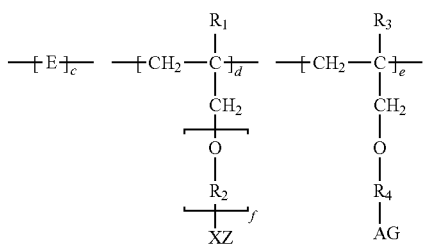

wherein E is the repeat unit remaining after polymerization of an ethylenically unsaturated compound; $R_1$ is H or lower alkyl ($C_1$-$C_4$);

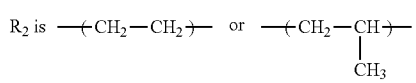

or $-(CH_2-CH_2-CH_2)-$; f is an integer of about 1-100, X and A are independently selected and are an anionic group selected from $OSO_3$, $SO_3$, $PO_3$, $OPO_3$, or $COO$; G and Z are independently selected and are chosen from H or a cationic group such as Na, K, or $NH_4$; $R_3$ is H or lower alkyl ($C_1$-$C_4$), and $R_4$ is a hydroxyl substituted alkylene radical having from 1 to about 6 carbon atoms;
subscripts c, d, and e represent the molar amounts of the monomer repeat units in the polymer and wherein c is present in an amount of 1-80, d is present in an amount of 0-30, and e is present in an amount of 0-30, with the proviso that at least one of d and e must be present and the sum of c+d+e=100; and
(B) an aminophosphonate.

2. The method as recited in claim 1, wherein c, d, and e are all present wherein c is present in an amount of 1-80, d is present in an amount of 1-30, and e is present in an amount of 1-30.

3. The method as recited in claim 2, wherein a brine laden aqueous product is produced in said system, defining produced water, said method comprising adding said scale inhibiting treatment to said produced water.

4. The method as recited in claim 3, wherein said produced water comprises a Ca content of 300 mg/L or greater.

5. The method as recited in claim 4, wherein said Ca content is 800 mg/L or greater.

6. The method as recited in claim 4, wherein said produced water has a temperature of 90° C. and higher and is under a pressure of 1 Atmosphere and greater.

7. The method as recited in claim 6, wherein said pressure is 300 psig and greater.

8. The method as recited in claim 6, wherein said scale is calcium sulfate, calcium carbonate, barium sulfate, or strontium sulfate.

9. The method as recited in claim 8, wherein said treatment is fed to said produced water in an amount of about 0.1-100 mg/L (combined A and B) of said produced water.

10. The method as recited in claim 6, wherein (A) is a terpolymer comprising repeat units of i) acrylic acid or salt, ii) allylalkoxylated ether or water soluble salt, and iii) allylhydroxylated alkyl ether or water soluble salt thereof.

11. The method as recited in claim 10, wherein A is a terpolymer of i) acrylic acid or salt, ii) allylpolyethoxy (10) sulfonate, and iii) allylhydroxypropylsulfonate ether.

12. The method as recited in claim 2, wherein said scale inhibiting treatment is added to a subterranean oil or gas bearing formation that is a component of said oil or gas production system.

13. The method as recited in claim 12, wherein said scale inhibiting treatment is added to steam or a fracking fluid that is in fluid communication with said subterranean oil or gas bearing formation.

14. The method as recited in claim 2, wherein said scale imparting treatment is added to produced water from said oil or gas production system.

15. The method as recited in claim 1, wherein said aminophosphonate is a member selected from the group consisting of HDTMP, DTPMP, ATMP, EDTMP, and TMTMP.

16. The method as recited in claim 15, wherein said aminophosphate is HDTMP.

17. The method as recited in claim 1, wherein said aminophosphonate is a polyamino polyether methylene phosphonate.

18. The method as recited in claim 11, wherein said aminophosphonate is HDTMP.

19. A method of inhibiting scale formation in an oil or gas production system comprising adding to said system a scale inhibiting treatment comprising:
- (A) a water soluble or dispersible polymer comprising a terpolymer of i) acrylic acid or salt, ii) allylpolyethoxy (10) sulfonate, and iii) allylhydroxypropylsulfonate ether; and
- (B) an aminophosphonate.

20. The method as recited in claim 19, wherein said aminophosphonate is HDTMP.

* * * * *